United States Patent
Durand et al.

(10) Patent No.: US 9,582,925 B2
(45) Date of Patent: Feb. 28, 2017

(54) METHOD FOR PROCESSING A VOLUME MODEL, RELATED COMPUTER PROGRAM PRODUCT AND PROCESSING SYSTEM

(71) Applicant: COMMISSARIAT A L'ENERGIE ATOMIQUE ET AUX ENE ALT, Paris (FR)

(72) Inventors: Pierre Durand, La Tronche (FR); Etienne Labyt, St Martin de Vinoux (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/580,773

(22) Filed: Dec. 23, 2014

(65) Prior Publication Data

US 2015/0178978 A1 Jun. 25, 2015

(30) Foreign Application Priority Data

Dec. 24, 2013 (FR) ...................................... 13 63569

(51) Int. Cl.
 *G06T 15/08* (2011.01)
 *G06T 19/20* (2011.01)
 *G06T 5/50* (2006.01)

(52) U.S. Cl.
 CPC ................ *G06T 15/08* (2013.01); *G06T 5/50* (2013.01); *G06T 19/20* (2013.01);
 (Continued)

(58) Field of Classification Search
 CPC G06T 5/50; G06T 15/08; G06T 19/20; G06T 2219/2021; G06T 2210/41;
 (Continued)

(56) References Cited

U.S. PATENT DOCUMENTS

2004/0138548 A1* 7/2004 Strommer ............ A61B 5/0555
 600/407
2008/0188741 A1* 8/2008 Mallya ................... A61B 6/032
 600/426
2012/0271151 A1 10/2012 Lavoilette et al.

FOREIGN PATENT DOCUMENTS

WO WO 2011/044442 A1 4/2011

OTHER PUBLICATIONS

Xiao et al. "The Application of Three-Dimension Brain Atlas in the Surgery Planning." 2nd International Congress on Image and Signal Processing, Oct. 17, 2009, pp. 1-4.*

(Continued)

*Primary Examiner* — Jon Chang
(74) *Attorney, Agent, or Firm* — Oblon, McClelland, Maier & Neustadt, L.L.P.

(57) ABSTRACT

This processing method provides the ability to process a volume mode with an object intended to be added to or subtracted from said model. The volume model includes points arranged according to a spatial grid in a first reference system, each point being assigned an intensity value. The object has points positioned in a second reference system that is distinct from the first reference system.
The method includes the calculation, for each point of the object, of an image point in the first reference system using a transfer function.
The method further includes the modification of the intensity of points of the volume model by applying a correction function associated with each image point, the value of the correction function at a point of the volume model being dependent on the position of said point relative to said image point with which said correction function is associated.

15 Claims, 3 Drawing Sheets

(52) U.S. Cl.
CPC ....... *G06T 2210/41* (2013.01); *G06T 2211/40* (2013.01); *G06T 2219/2021* (2013.01)

(58) Field of Classification Search
CPC . G06T 2207/10081; G06T 2207/10088; G06T 2211/40; A61B 6/5229
USPC .................................................. 382/128, 131
See application file for complete search history.

(56) References Cited

OTHER PUBLICATIONS

French Preliminary Search Report issued Jul. 22, 2014 in French Application 13 63569, filed on Dec. 24, 2013 ( with English Translation of Categories of Cited Documents).
Arie Kaufman et al. "Overview of Volume Rendering", Visualization Handbook, XP-002412245, 2004, 26 pages.
Andrew R. Dykstra et al. "Individualized localization and cortical surface-based registration of intracranial electrodes", NeuroImage 59, 2012, 8 pages.
Po T. Wang et al. "A co-registration approach for electrocorticogram electrode localization using post-implantation MRI and CT of the head", 6th Annual International IEEE EMBS Conference on Neural Engineering, 2013, 4 pages.
Marta Kersten-Oertel et al. "Volume Visualization for Neurovascular Augmented Reality Surgery", Radio Frequency Indentification, XP047041802, 2013, 10 pages.
Dora Hermes et al. "Automated electrocorticographic electrode localization on individually rendered brain surfaces", Journal of Neuroscience Methods 185, 2010, 6 pages.
Sarang S. Dalal et al. "Localization of neurosurgically implanted electrodes via photograph-MRI-radiograph coregistration", Journal of Neuroscience Methods 174, 2008, 10 pages.
Ole Vegard Solberg et al. "Freehand 3D Ultrasound Reconstruction Algorithms—A Review", Ultrasound in Medicine and Biology, vol. 33, No. 7, 2007, 19 pages.
Wenli Cai et al. "Data Intermixing and Multi-vol. Rendering", Computer Graphics Forum, XP001034487, vol. 18, No. 3, 1999, 12 pages.

* cited by examiner

METHOD FOR PROCESSING A VOLUME MODEL, RELATED COMPUTER PROGRAM PRODUCT AND PROCESSING SYSTEM

BACKGROUND OF THE INVENTION

The present invention relates to a method for processing a volume model, in particular an anatomical model, with at least one object intended to be added to or subtracted from said model. The volume model includes a set of points arranged according to a spatial grid in a first reference system, each of said points being assigned an intensity value. The object includes a plurality of points positioned in a second reference system that is distinct from the first reference system.

The method includes the calculation, for each point of the object, of an image point in the first reference system using a transfer function for transferring from the second reference system to the first reference system.

The invention also relates to a computer program product comprising of software instructions that, when run by a computer, proceed to implement such a processing method.

The invention also relates to an electronic processing system for processing a volume model with at least one object intended to be added to or subtracted from said model.

The invention in particular relates to the field of medical imaging, such as cross sectional medical imaging towards surgical ends. The volume model is an anatomical model that is in conformity with the DICOM format (abbreviated from Digital Imaging Communication Object Model), and thus the first reference system is then in conformity with the DICOM format. The object intended to be added to or subtracted from the anatomical model is initially recorded in a separate format distinct from the DICOM format, and the object is an implant intended to be inserted into the anatomical model. Alternatively, the object is a part of the anatomical model intended to be removed.

In addition to the anatomical data, the first model may include functional data, such as functional data related to magnetoencephalography, also referred to as MEG functional data. The first reference system is then modified to conform to the Talairach reference system.

One method of the abovementioned type is already known. The volume model is an anatomical model, such as a model reconstructed based on images obtained according to an imaging technique using magnetic resonance imaging (MRI) and formed of a plurality of parallel planes, two adjacent parallel planes being spaced apart by a given distance corresponding to a sampling interval, along a direction perpendicular to the parallel planes. Each plane of the anatomical model corresponds to a cross sectional image. The volume model is defined in a first reference system, the set of points forming this model being positioned in this first reference system.

In the event of addition to or subtraction from this model of an object defined in a second reference system that is distinct from the first reference system, a transfer function is applied to each of the points forming the object in order to effect the change of reference system from the second reference system to the first reference system.

However, with such a method, the rendering of the volume model is not optimal following the addition or subtraction of the object, the object being added or subtracted not always being clearly visible.

SUMMARY OF THE INVENTION

The aim of the invention is thus to provide a method and an electronic processing system for processing a volume model with at least one object intended to be added or subtracted thereby providing the ability to obtain an optimal rendering of the model following the addition or subtraction of the object, and in particular to more precisely view the object that has been added or subtracted when the volume model is an imaging model intended to be displayed on a screen.

To this end, the subject-matter of the invention relates to a method for processing a volume model, in particular an anatomical model, with at least one object intended to be added to or subtracted from said model, the volume model including a set of points arranged according to a spatial grid, in a first reference system, each of said points being assigned an intensity value, the object including a plurality of points positioned in a second reference system that is distinct from the first reference system, the method including the calculation, for each point of the object, of an image point in the first reference system using a transfer function for transferring from the second reference system to the first reference system;

wherein the method further includes the modification of the intensity of points of the volume model by applying a correction function associated with each image point;

the value of the correction function at a point of the volume model being dependent on the position of said point relative to said image point with which said correction function is associated.

With the processing method according to the invention, a correction function is applied for correction of the grey level (or intensity) of all or part of the points constituting the volume model. More precisely, the points of the volume model, and in particular the points in the vicinity of an image point, undergo a correction of their intensity, the correction applied depending on their position in relation to said image point. In other words, at each image point of the object, a correction function is established, this latter modulating the intensity of the points of the volume model, and in particular those placed in the vicinity of the image point.

This makes it possible to improve the rendering of the volume model after the addition or subtraction of the object. Indeed, the correction function provides the ability to perform an extrapolation around this each image point of the object that has been added to or subtracted from the volume model. Thus the visibility of the object in the volume model is thereby improved.

This provides the ability to resolve the problem of the state of the art which results from a difference between the spatial resolution of the object intended to be added or subtracted and that of volume model: when the transfer function is applied to each point of the object, the "image" points of the object are obtained in the first reference system. On account of the difference in spatial grid between the two reference systems, some image points may not appear on the volume model as their coordinates do not correspond to grid centres.

More schematically, a volume model is a set of points arranged according to a spatial grid, the space between two adjacent points of the grid, referred to as grid centres, being undetermined. According to the method known in the state of the art, when an object is added, by determining the coordinates of the points of which it is constituted in the coordinate system in the volume model, some points of the object do not coincide with the volume model grid, and do not appear on the volume model after adding the object. As a result thereof, the integration of the object in the volume model is imperfect, which is not acceptable in applications that require high spatial resolution, in particular in medical applications.

In addition, the volume model is an anatomical model, and in particular a model obtained by the juxtaposing of parallel planes, these latter being obtained by means of a medical imaging modality, in particular Magnetic Resonance Imaging (MRI) or X ray tomography. In this case, the grid of the model depends on the spatial grid of each plane, as well as the distance between two adjacent planes. In this case, the anatomical model is constructed in a reference system known by the name DICOM reference system.

According to other advantageous aspects of the invention, the processing method includes one or more of the following characteristic features, taken into consideration individually or in accordance with all technically possible combinations:
  the method includes, for all or part of the points of the volume model, the following steps:
    the summation of each function associated with each image point; and
    the comparison between the intensity of the point before and after summation of each function, with the lowest intensity, or the highest intensity, respectively, being retained in case of subtraction or addition, respectively, of the object;
  the object is an object intended to be added, and the correction function associated with each image point is a function whose value, at a point of the model, approaches ever closer to 0 the greater the distance is between this point of the model and the image point;
  the object is an object intended to be subtracted, and the correction function associated with each image point is a function whose value, at a point of the model, approaches ever closer to 0 the smaller the distance is between this point of the model and the image point;
  the correction function associated with an image point includes a corrective modulus that is dependent on the distance, in particular Euclidean distance, between said image point and the point of the volume model in the first reference system;
  the corrective modulus is also dependent on a spreading factor, the spreading factor being multiplied by said distance;
  the value of the spreading factor is comprised between 1 and 4;
  the object is made of a material, and the correction function is equal to the corrective modulus multiplied by a weighting factor, that is the weighting factor of said material;
  the corrective modulus is a function of the Euclidean distance, a function that is continuous, symmetrical about the null distance and whose values are comprised between 0 and 1;
  when the object is an object intended to be added, the value of the corrective modulus is equal to 1 for a null value for the Euclidean distance between the image point and the point of the volume model, and the value of the corrective modulus decreases towards 0 as the absolute value of said Euclidean distance increases; and
  when the object is an object intended to be subtracted, the value of the corrective modulus ($M_{n,i}$) is equal to 0 for a null value for said Euclidean distance, and the value of the corrective modulus increases towards 1 as the absolute value of said Euclidean distance increases;
  the corrective modulus satisfies the following equation:

$$M_{n,i}(P) = \begin{cases} e^{-\mu_n \cdot DIST(P, T_{n \to MRI}(P_{n,i}))^2}, & \text{if } \Gamma_n = 1 \\ (1 - e^{-\mu_n \cdot DIST(P, T_{n \to MRI}(P_{n,i}))^2}), & \text{if } \Gamma_n = -1 \end{cases}$$

where n is an index of a corresponding object,
  i is an index of a point of the corresponding object,
  $P_{n,i}$ represents the coordinates of the index point i of the object having the index n in the second reference system,
  $T_{n \to MRI}$ represents the transfer function for transferring from the second reference system to the first reference system,
  P represents the coordinates of the volume model in the first reference system,
  DIST represents the Euclidean distance in the first reference system,
  $\mu_n$ represents the spreading factor, and
  $\Gamma_n$ is a control parameter, equal to 1 when the object is an object intended to be added, and equal to −1 when the object is an object intended to be subtracted;
  the volume model is an imaging model, such as an anatomical model, intended to be displayed on a screen;
  the volume model includes a description of a cortical surface, the first reference system being the Talairach reference system; and
  the volume model includes functional information, and the step of calculation, for each point of the object, of an image point in the first reference system is also performed on the basis of said functional information.

The subject-matter of the invention also relates to a non-transitory computer readable medium including a computer program product comprising software instructions that, when run by a computer, implement such a processing method as defined here above.

The subject-matter of the invention also relates to an electronic processing system for processing a volume model, in particular an anatomical model, with at least one object intended to be added to or subtracted from said model, with the volume model including a set of points arranged according to a spatial grid in a first reference system, each of said points being assigned an intensity value, and the object including a plurality of points positioned in a second reference system that is distinct from the first reference system;
  the system comprising calculating means for calculating, for each point of the object, an image point in the first reference system using a transfer function for transferring from the second reference system to the first reference system;
  wherein the system further includes intensity modifying means for modifying the intensity of points of the volume model by applying a correction function associated with each image point;
  the value of the correction function at a point of the volume model being dependent on the position of said point relative to said image point with which said correction function is associated.

BRIEF DESCRIPTION OF THE DRAWINGS

The characteristic features and advantages of the invention will become apparent upon reading the following description given purely by way of non limiting example, and with reference made to the accompanying drawings, in which.

DETAILED DESCRIPTION OF PREFERRED EMBODIMENTS

Figure 1:
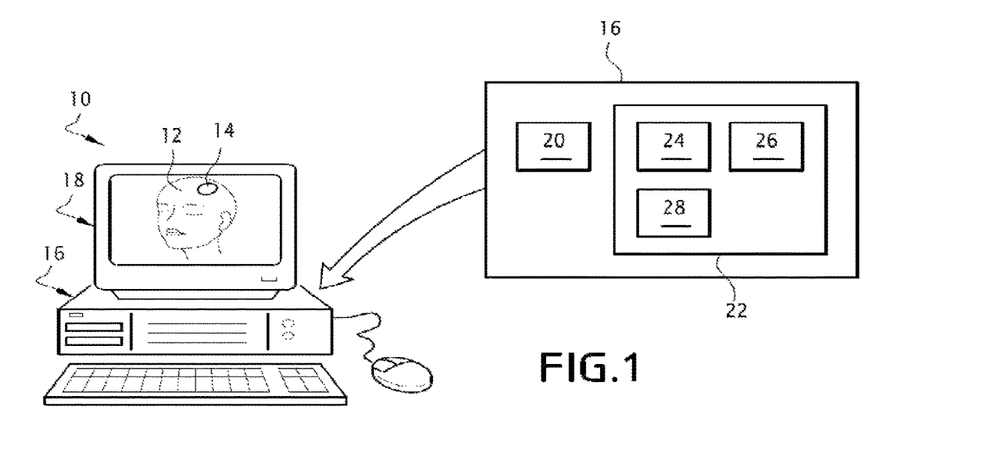
FIG. 1 is a schematic representation of a processing system according to the invention, capable of processing a volume model with at least one object intended to be added to or subtracted from said model, the volume model including a plurality of points arranged along a plurality of parallel planes and positioned in a first reference system, the object including a plurality of points positioned in a second reference system that is distinct from the first reference system.

In FIG. 1, an electronic processing system 10 for processing a volume model 12 with at least one object 14 intended to be added to or subtracted from said model comprises a data processing unit 16 and a display screen 18 adapted for displaying images, such as an image of the volume model 12, an initial image of the object 14 to be added or subtracted.

Figure 2:
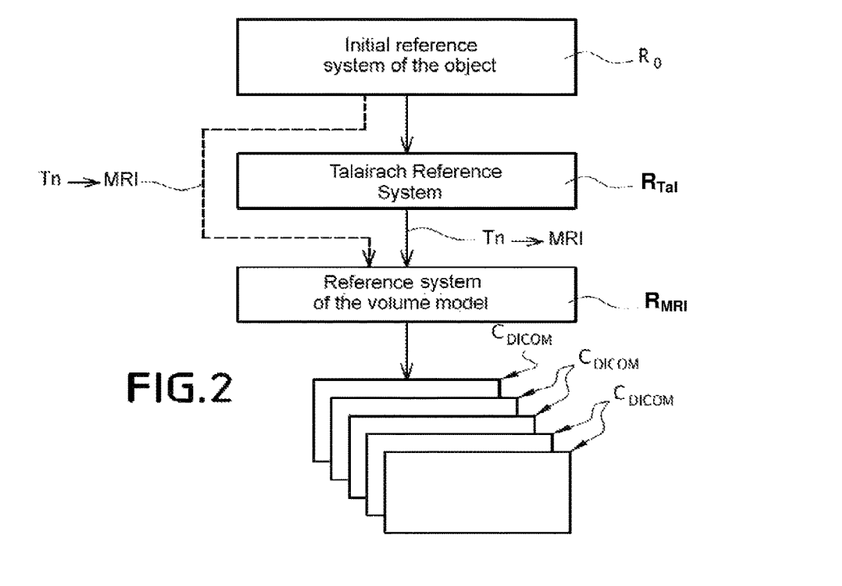
FIG. 2 is a schematic representation of successive reference system changes from an initial reference system of the object to the reference system of the volume model.

The volume model 12 includes a set of points P belonging to a plurality of parallel planes and positioned in a first reference system $R_{MRI}$, visible in FIG. 2. The volume model 12 has an amplitude, such as an intensity expressed in levels of grey, at each of said points P.

The volume model 12 is, for example, an anatomical model in conformity with the DICOM format and the first reference system is then in conformity with the DICOM format.

More generally, the invention relates to a three dimensional model including a plurality of points distributed according to a spatial grid. Each point is assigned an intensity value, such as the grey level when the model is represented in black and white. The intensity is, for example, the intensity of the point in one or more wavelengths where the model is not monochrome.

The object 14, denoted by $S_n$, includes a plurality of points $P_{n,i}$ positioned in a second reference system $R_n$ that is distinct from the first reference system $R_{MRI}$. In particular, the second reference system $R_n$ is separate from the first reference system $R_{MRI}$. Thus, in the second reference system $R_n$, the object $S_n$ is constituted by a set of points P.

The method that is the subject matter of the invention provides the ability to add an object to the volume model, in which case the object is an auxiliary object, or to remove an object from the model.

When the object is not initially included in the model, it is, for example, recorded in a format that is distinct from the DICOM format. By way of an example, the object is a device, referred to as an implant, intended to be implanted in the body of a patient, for example a prosthesis, an electronic device, one or more electrodes, or surgical equipment items typified by screws, pins, or similar. The processing system 10 is capable of proceeding directly from the second reference system $R_n$ to the first reference system $R_{MRI}$ of the volume model.

The information processing unit 16, shown in FIG. 1, includes a data processor 20 and a memory storage 22 associated with the processor 20.

The memory storage 22 is capable of storing a calculation software application 24 for calculating, for each point $P_{n,i}$ of the object 14, an image point $T_{n\text{->}MRI}(P_{n,i})$ in the first reference system $R_{MRI}$ using a transfer function $T_{n\text{->}MRI}$ for transferring from the second reference system $R_n$ to the first reference system $R_{MRI}$.

According to the invention, the memory storage 22 is capable of storing an amplitude modification software 26 for modification of the amplitude of points of the volume model 12 via a correction function $F_{n,i}$, associated with each image point $T_{n\text{->}MRI}(P_n,i)$. This correction function $F_{n,i}$ is applied to each point of the model, or to the points of the model situated in the vicinity of an image point $T_{n\text{->}MRI}(P_{n,i})$. The vicinity of an image point refers to the points of the volume model that are adjacent to said image point, or the points of the volume model that are closest to the image point. The value of the correction function $F_{n,i}$ is dependent on the position of each point of the model 12 in relation to the image point $T_{n\text{->}MRI}(P_{n,i})$ with which said function is associated.

Alternatively, the calculating means 24 and the amplitude modifying means 26 are designed in the form of programmable logic components, or even in the form of dedicated integrated circuits.

The correction function $F_{n,i}$ is capable of modifying the amplitude of certain points P of the volume model 12, in particular those situated in the vicinity of the image point with which the function is associated. The correction function $F_{n,i}$ is preferably capable of modifying the amplitude of each of the points P of the volume model 12. It allows for effecting a modification in the intensity of the points of the volume model 12 around each image point, that is to say, in the vicinity of each image point.

According to one variant, the three dimensional volume model takes into account the functional information in addition to the anatomical structure. For example, when the anatomical model describes a cortical surface, it integrates the functional mapping of cortical activation. In such a case, prior to the object being taken into consideration in the model, a change in the coordinate system is made, in a manner such that the coordinate system of the volume model corresponds to the reference system referred to as Talairach system $R_{Tal}$, well known in the field of neurosurgery.

In other words, according to this variant embodiment, the first reference system $R_{MRI}$ is previously adjusted, in a manner such that $R_{MRI}=R_{Tal}$. The interesting advantage of this variant is the ability to position the object in the model not only on the basis of structural anatomical data, but also on the basis of functional data. This variant is particularly suitable for the positioning of electrodes for measurement or for cortical stimulation.

The transfer function $T_{n\text{->}MRI}$ implemented by the calculation software application 24 is known per se, the transition/passing from the second reference system $R_n$ to the first reference system $R_{MRI}$ being for example effected by using a change matrix for changing reference system.

The correction function $F_{n,i}$, associated with an image point of the volume model, may include a corrective modulus $M_{n,i}$, that is dependent on a Euclidean distance DIST(P, $T_{n\text{->}MRI}(P_{n,i})$) between said image point $T_{n\text{->}MRI}(P_{n,i})$ and the point P of the volume model, this Euclidean distance being measured in the first reference system $R_{MRI}$.

The Euclidean distance DIST(A, B) between the points A and B, from coordinates $x_A$, $y_A$, $z_A$, respectively to $x_B$, $y_B$, $z_B$, in the first reference system $R_{MRI}$, satisfies the following equation, as is known per se:

$$\text{DIST}(A,B) = \sqrt{\|x_A - x_B\|^2 + \|y_A - y_B\|^2 + \|z_A - z_B\|^2} \quad (1)$$

The correction function $F_{n,i}$ is preferably equal to the corrective modulus $M_{n,i}$, multiplied by a weighting factor $z_n$, the weighting factor $z_n$ being dependent on the object 14. In a general manner, the higher the value of the weighting factor, the more rapidly will the function change in the vicinity of the image point. The value of the weighting factor $z_n$ is dependent, for example, on the constituent material of the auxiliary object added. For example, the denser the material, the higher will be the value taken by the weighting factor $z_n$, such as a value substantially equal to 400 for a bone, and equal to 1000 for a metal. The adjustment of the value of this coefficient provides the ability to obtain a level of intensity that is consistent with the intensity of various different materials represented in the volume model.

The correction function $F_{n,i}$ then satisfies the following equation:

$$F_{n,i}(P) = z_n \cdot M_{n,i}(P) \quad (2)$$

The corrective modulus $M_{n,i}$ is a function of the Euclidean distance DIST(P, $T_{n \to MRI}(P_{n,i})$), and this function is continuous and symmetrical around the image point, that is to say, for values around null distance, the values thereof further being comprised between 0 and 1.

When the object 14 is an object intended to be added to the volume model 12, the value of the corrective modulus $M_{n,i}$ is for example equal to 1 for a null value for the Euclidean distance DIST(P, $T_{n \to MRI}(P_{n,i})$) between the image point $T_{n \to MRI}(P_{n,i})$ and the point P of the volume model 12, and the value of the corrective modulus $M_{n,i}$ decreases towards 0 as the absolute value of said Euclidean distance DIST(P, $T_{n \to MRI}(P_{n,i})$) increases. Thus, when a physical object is added to the model, the correction function is decreasing around the image point. The value of the function, at a point of the model approaches ever closer to 0 the greater the distance is between this point and the image point.

When the object 14 is an object intended to be subtracted from the volume model 12 for example in the case where the object 14 represents a drilling zone, the value of the corrective modulus $M_{n,i}$ is for example equal to 0 for a null value for said Euclidean distance DIST(P, $T_{n \to MRI}(P_{n,i})$), and the value of the corrective modulus $M_{n,i}$ increases towards 1 as the absolute value of said Euclidean distance DIST(P, $T_{n \to MRI}(P_{n,i})$) increases. Thus, when a physical object is subtracted from the model, the correction function is increasing around the image point. The value of the function, at a point of the model approaches ever closer to 0 the smaller the distance is between this point and the image point. The term 'subtraction of an object from the model', is used to refer in particular to the excision of an anatomical part, such as a tumour, or the simulation of a craniotomy.

In addition and in an optional manner, the corrective modulus $M_{n,i}$ is also dependent on a spreading factor $\mu_n$, the spreading factor $\mu_n$ being multiplied by the Euclidean distance DIST(P, $T_{n \to MRI}(P_{n,i})$). In other words, the spreading factor $\mu_n$ is a parameter to be used to modify the focusing of the function around the image point. The value of the spreading factor $\mu_n$ is preferably comprised between 1 and 4. The spreading factor $\mu_n$ is, for example, equal to 1 to represent an electrode, and equal to 4 to represent a millimetre coordinate system axis, or a drilling zone The corrective modulus $M_{n,i}$ thus then satisfies, for example, the following equation:

$$M_{n,i}(P) = \begin{cases} e^{-\mu_n \cdot \text{DIST}(P, T_{n \to MRI}(P_{n,i}))^2}, & \text{if } \Gamma_n = 1 \\ \left(1 - e^{-\mu_n \cdot \text{DIST}(P, T_{n \to MRI}(P_{n,i}))^2}\right), & \text{if } \Gamma_n = -1 \end{cases} \quad (3)$$

where n is an index of a corresponding object 14;

i is an index of a point of the corresponding object 14;

$P_{n,i}$ represents the coordinates of the index point i of the object 14 having the index n in the second reference system $R_n$;

$T_{n \to MRI}$ represents the transfer function for transferring from the second reference system $R_n$ to the first reference system $R_{MRI}$;

P represents the coordinates of the volume model 12 in the first reference system $R_{MRI}$;

DIST represents the Euclidean distance in the first reference system $R_{MRI}$;

$\mu_n$ represents the spreading factor; and $\Gamma_n$ is a control parameter, equal to 1 when the object 14 is an object intended to be added, and equal to -1 when the object 14 is an object intended to be subtracted.

The correction function $F_{n,i}$ then preferably satisfies the following equation, based on the preceding equations (2) and (3):

$$F_{n,i}(P) = \begin{cases} z_n \cdot e^{-\mu_n \cdot \text{DIST}(P, T_{n \to MRI}(P_{n,i}))^2}, & \text{if } \Gamma_n = 1 \\ z_n \cdot \left(1 - e^{-\mu_n \cdot \text{DIST}(P, T_{n \to MRI}(P_{n,i}))^2}\right), & \text{if } \Gamma_n = -1 \\ 0, & \text{si } \Gamma_n = 0 \end{cases} \quad (4)$$

where the control parameter $\Gamma_n$ is equal to 0 when the object 14 is ignored.

The correction function $F_{n,i}$ is preferably applied to each point P of the volume model 12 and for each index point i of each object 14 having the index n.

The correction function previously described above has the form of a Gaussian function. Alternatively, the correction function $F_{n,i}$ is a linear function, in the sense that its value varies linearly around the image point with which it is associated.

Figure 3:
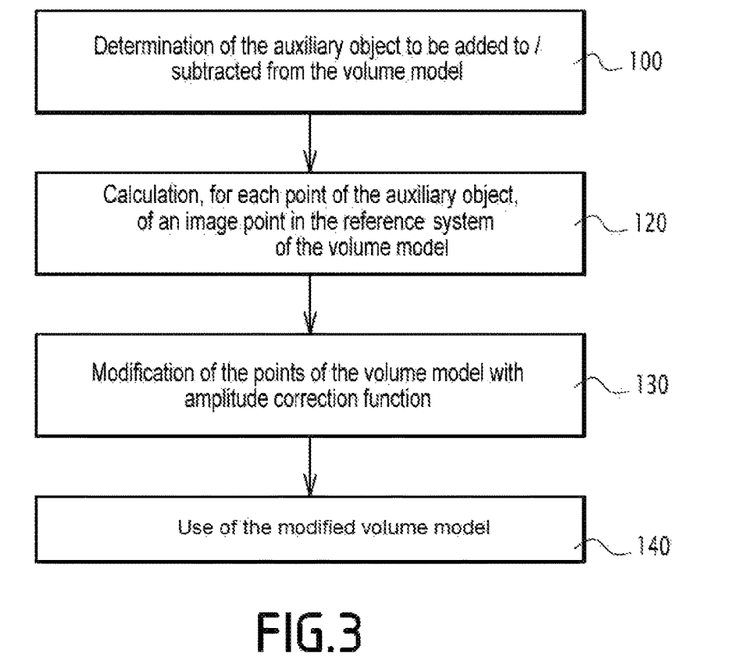
FIG. 3 is a flowchart of a processing method according to the invention.

The operation of the processing system 10 according to the invention will now be explained according to FIG. 3 representing a flowchart of a method for processing the volume model 12 according to the invention.

During the initial step 100, each object 14 intended to be added to or subtracted from the volume model 12 is determined from placement data of the object. In addition, the object 14 is determined by using data relating to the implant, when the object 14 is an implant to be added into an anatomical model, and by using functional data. When an operation to be performed on the volume model 12 consists of ablating the material of the volume model, the object 14 then is an object intended to be subtracted, and with the form of the object corresponding to the form for the ablation of material.

The processing method then proceeds to the step 120 in order to calculate, for each point $P_{n,i}$ of the object 14, the image point $T_{n \to MRI}(P_{n,i})$ in the first reference system $R_{MRI}$ using the transfer function $T_{n \to MRI}$. Upon conclusion of the step 120, the volume model 12 and the image points $T_{n \rightarrow MRI}(P_{n,i})$ associated with the object 14 are then all positioned in the first reference system $R_{MRI}$.

The amplitude of certain points P of the volume model 12, preferably all of the points P of the volume model 12, is then, according to the invention, modified during the next step 130 via the correction function $F_{n,i}$ this latter being in particular applied to the vicinity of each point image. The correction function $F_{n,i}$ applied to the volume model 12 is, by way of example, that defined by the equation (4).

For each point P of the volume model 12, the sum of the functions $F_{n,i}$ associated with the different image points of the object, is then obtained in accordance with the following equations, with the objects 14 added and subtracted being processed separately:

$$\alpha(P) = \sum_{n, \Gamma_n = 1} \sum_i F_{n,i}(P) \quad (5)$$

$$\beta(P) = \sum_{n, \Gamma_n = -1} \sum_i F_{n,i}(P) \quad (6)$$

Then, for each point P of the volume model 12 that possesses an original value for the amplitude, denoted as $v_{origin}$, the modified value of the intensity, denoted as $v_{merge}$, is calculated according to the following equations:

$$v_{int}(P) = \min(v_{origin}(P), \beta(P)) \quad (7)$$

$$v_{merge}(P) = \max(v_{int}(P), \alpha(P)) \quad (8)$$

The equation (7) firstly serves to take away the objects 14 intended to be subtracted for calculating an intermediate value $V_{int}$, then the equation (8) is used to add the objects 14 intended to be added for calculating the modified value of the amplitude $v_{merge}$.

In other words, the method according to the invention includes, by way of example, for all or part of the points P of the volume model, the following steps:
- the summation of each function $F_{n,i}$ associated with each image point $T_{n \rightarrow MRI}(P_{n,i})$
- the comparison between the intensity of the point before and after summation of each function $F_{n,i}$, the lowest intensity or the highest intensity, respectively, being retained in case of withdrawal or addition, respectively, of the object.

The data corresponding to the volume model 12 modified by using the amplitude correction function are in addition, during the step 140, transmitted to another device, such as a surgical assist robot, in order to be appropriately exploited. Said data transmitted for example are cross sectional views in DICOM format, denoted as $C_{DICOM}$, as represented in FIG. 2.

Alternatively, or in addition, the use of the data corresponding to the modified volume model 12 consists of the display of the modified volume model on the display screen 18.

The processing system 10 and the processing method according to the invention thus provide the ability to obtain improved rendering of the volume model 12 after the addition or subtraction of the object or objects 14. It is thereby possible to improve the visibility of each object 14 integrated in the volume model 12.

This then makes it possible to in fine ensure better positioning of each object 14 when the volume model 12 is intended to be displayed on the display screen 18 or indeed to be exploited by another device, such as a surgical station.

Figure 4:
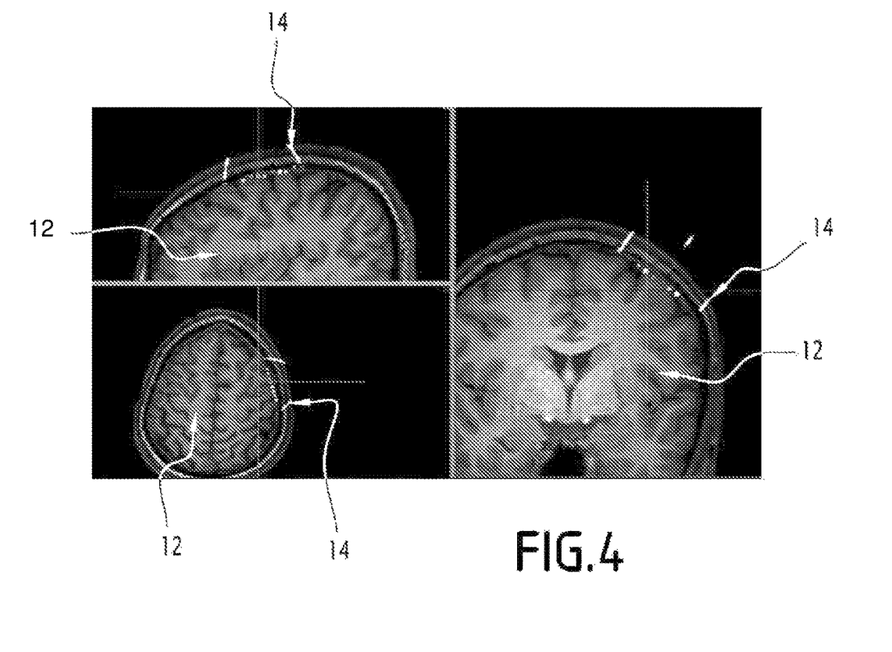
FIG. 4 is a set of cross sectional views of the volume model modified according to the invention after addition/subtraction of objects.
Figure 5:
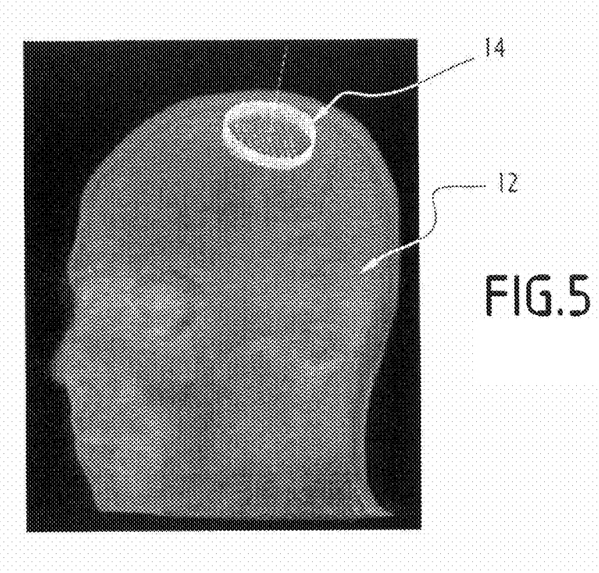
FIGS. 5 and 6 are perspective views of the volume model modified according to the invention after addition/subtraction of objects.
Figure 6:
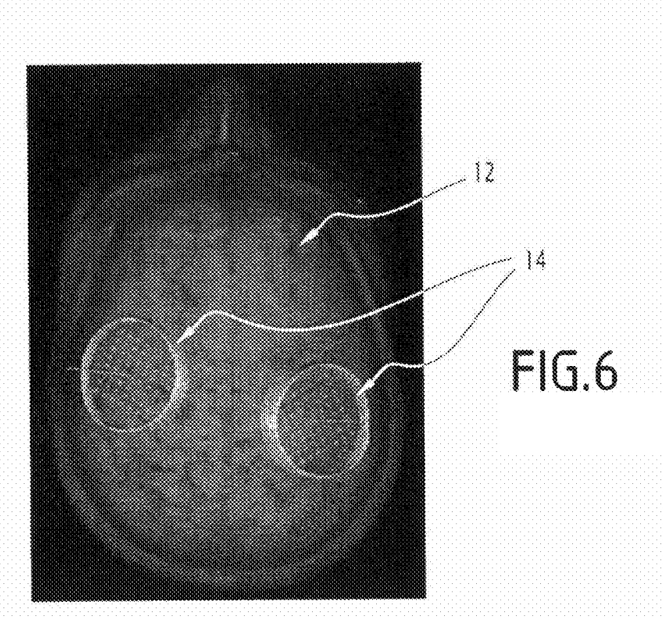

In the case of a medical application related to the brain of a patient, the processing system 10 and the processing method according to the invention provide the ability for example to better position the sensor or sensors of a direct neural control system, as illustrated by way of example in FIGS. 4 to 6.

In FIGS. 4 to 6, the objects 14 are each in the form of a cylinder, and correspond to the holes that are to be drilled in the cranium of the patient for the implantation of two implants each having a cortical electrode matrix array, the locations of the two implants, as well as of the electrode matrix arrays being clearly visible in FIG. 6.

It should be noted that during this test, the positioning of the electrode matrix arrays was determined by using an anatomical model integrating data from cortical functional maps. In order to do this, the reference system of the volume model had previously been converted into the Talairach reference system, as previously described.

It is then observed across the different FIGS. 4 to 6 that the objects 14 are visible in an extremely clear manner on the volume model 12 whatever the angle of observation is. The object 14 is represented with a grey level close to the colour white, which corresponds to an object to be removed, the objects 14 being in this example the burr holes.

It is thus conceivable that the processing system 10 and the processing method according to the invention provide the ability to obtain a more precise rendering of the model 12 following the addition or subtraction of each object 14, and in particular to more precisely view each object 14 when the volume model 12 is an imaging model intended to be displayed on the screen 18.

As indicated previously, according to one variant embodiment, the three dimensional volume model takes into account the functional information, also known as functional data, in addition to the anatomical structure.

The term 'functional information', is used to refer to the spatial distribution, in the anatomical model of a physiological parameter, this parameter being for example:
- a reconstruction of neuronal current source density, this reconstruction being obtainable over the database of magnetoencephalography data, also known as MEG data, or the database of electroencephalography data, also known as EEG data;
- a functional MRI type mapping, (BOLD effect, from Blood Oxygen Level Dependent).

The invention claimed is:

1. A method for processing a volume model with at least one object intended to be added to or subtracted from said model, the method being implemented by a computer,
   the volume model including a set of first points arranged according to a spatial grid, in a first reference system, each of said first points being assigned an intensity value,
   the object including a plurality of second points positioned in a second reference system that is distinct from the first reference system,
   the method comprising:
   receiving one or more images of a physical object, the one or more images being a magnetic resonance imaging (MRI) image or an X-ray tomography image, and generating the volume model based on the received one or more images; and
   calculating, for each second point, an image point in the first reference system using a transfer function from the second reference system to the first reference system;

wherein the method further includes modifying the intensity of first points by applying a correction function associated with each image point;
the value of the correction function at a first point being dependent on the position of said first point relative to said image point with which said correction function is associated; and
wherein the correction function associated with an image point includes a corrective modulus that is dependent on the distance between said image point and the first point in the first reference system.

2. A method according to claim 1, wherein the method includes, for all or part of the first points, the following steps:
the summation of each correction function associated with each image point, and
the comparison between the intensity of the first point before and after summation of each function, with the lowest intensity, or the highest intensity, respectively, being retained in case of subtraction or addition, respectively, of the object.

3. A method according to claim 1, wherein when the object is an object intended to be added, the correction function associated with each image point is a function whose value, at a first point, approaches ever closer to 0 the greater the distance is between this first point and the image point.

4. A method according to claim 1, wherein when the object is an object intended to be subtracted, the correction function associated with each image point is a function whose value, at a first point, approaches ever closer to 0 the smaller the distance is between this first point and the image point.

5. A method according to claim 1, wherein the corrective modulus is also dependent on a spreading factor, the spreading factor being multiplied by said distance.

6. A method according to claim 5, wherein the value of the spreading factor is between 1 and 4.

7. A method according to claim 5, wherein the correction function associated with an image point includes a corrective modulus that is dependent on the distance between said image point and the first point in the first reference system, and
wherein the corrective modulus satisfies the following equation:

$$M_{n,i}(P) = \begin{cases} e^{-\mu_n \cdot DIST(P, T_{n\to MRI}(P_{n,i}))^2}, & \text{if } \Gamma_n = 1 \\ \left(1 - e^{-\mu_n \cdot DIST(P, T_{n\to MRI}(P_{n,i}))^2}\right), & \text{if } \Gamma_n = -1 \end{cases}$$

where n is an index of a corresponding object;
i is an index of a second point of the corresponding object;
$P_{n,i}$ represents the coordinates in the second reference system of the second point with index i for the object with index n;
$T_{n\to MRI}$ represents the transfer function from the second reference system to the first reference system;
P represents the coordinates of the volume model in the first reference system;
DIST represents the Euclidean distance in the first reference system;
$\mu_n$ represents the spreading factor; and
$\Gamma_n$ is a control parameter, equal to 1 when the object is an object intended to be added, and equal to −1 when the object is an object intended to be subtracted.

8. A method according to claim 1, wherein the object is made of a material, and wherein the correction function is equal to the corrective modulus multiplied by a weighting factor, the weighting factor being dependent on said material.

9. A method according to claim 1, wherein the corrective modulus is a function of the Euclidean distance, said function being continuous, symmetrical about the null distance and with values between 0 and 1.

10. A method according to claim 1, wherein when the object is an object intended to be added, the value of the corrective modulus is equal to 1 for a null value for the Euclidean distance between the image point and the first point, and the value of the corrective modulus decreases towards 0 as the absolute value of said Euclidean distance increases, and
wherein when the object is an object intended to be subtracted, the value of the corrective modulus is equal to 0 for a null value for said Euclidean distance, and the value of corrective modulus increases towards 1 as the absolute value of said Euclidean distance increases.

11. A method according to claim 1, wherein the volume model is an imaging model to be displayed on a screen.

12. A method according to claim 1, wherein the volume model includes a description of a cortical surface, the first reference system being the Talairach reference system.

13. A method according to claim 1, wherein the volume model includes functional information, and
the step of calculation, for each second point, of an image point in the first reference system is performed also on the basis of said functional information.

14. A non-transitory computer readable medium including a computer program product comprising software instructions that, when run by a computer, implement the method according to claim 1.

15. An electronic processing system for processing a volume model with at least one object intended to be added to or subtracted from said model, with the volume model including a set of first points arranged according to a spatial grid in a first reference system, each of said first points being assigned an intensity value, and the object including a plurality of second points positioned in a second reference system that is distinct from the first reference system;
the system comprising:
processing circuitry configured for
receiving one or more images of a physical object, the one or more images being a magnetic resonance imaging (MRI) image or an X-ray tomography image, and generating the volume model based on the received one or more images; and
calculating, for each second point, an image point in the first reference system using a transfer function from the second reference system to the first reference system;
wherein the processing circuitry is further configured for modifying the intensity of first points by applying a correction function associated with each image point;
the value of the correction function at a first point being dependent on the position of said first point relative to said image point with which the correction function is associate; and
wherein the correction function associated with an image point includes a corrective modulus that is dependent on the distance between said image point and the first point in the first reference system.

* * * * *